United States Patent Office 3,409,630
Patented Nov. 5, 1968

3,409,630
WATER-SOLUBLE SALTS OF NITRO-SUBSTITUTED 3-PYRIDOLS
Roy C. De Selms, San Rafael, Calif., assignor to Chevron Research Company, San Francisco, Calif., a corporation of Delaware
No Drawing. Filed Nov. 26, 1965, Ser. No. 510,070
7 Claims. (Cl. 260—297)

ABSTRACT OF THE DISCLOSURE

Water-soluble salts of 3-pyridols having 1 to 2 nuclear nitro substituents, one of which is in the 2 position, and 0 to 3 nuclear substituents selected from the group consisting of lower alkyl and halogen of atomic number 9 to 35. The cationic portion of these salts may be an alkali metal, magnesium or ammonium ion. These salts are useful as herbicides.

---

This invention pertains to a new group of water-soluble pyridolic salts which are useful as pre-emergence herbicides. More particularly, it concerns herbicidally active salts of 2-nitro-3-pyridols which may be employed in anqueous formulations.

Although a great many herbicidally active compounds have been developed, the problem of effectively controlling undesirable vegetation is still very prevalent. Hence, the search for new and effective herbicidal compounds continues to be of great importance.

Among the most efficient herbicides are those which have selective pre-emergence activity. These compounds may be used to kill seeds, germinating seeds and seedlings of undesirable plants without harming contiguous desirable vegetation.

An important factor in the value of a herbicide is whether it can be easily formulated at high as well as low concentrations with common liquid solvents. One of the best ways to ship a herbicide is as a liquid concentrate. It is easy to handle and economic. Also, you can put other compatible biologically active compounds as well as surfactants, fertilizers and the like in it. In this mode it is ready to dilute to the concentration desired for spreading on the plant environment. Liquid formulations are also better than other formulations when immediate and effective absorption into the soil is desired. For instance, under windy conditions using a liquid formulation rather than a dry one cuts down on herbicide loss.

A new group of pyridolic salts have now been found which have excellent selective pre-emergence herbicidal activity and are very soluble in water. These unique compounds are water-soluble salts of 3-pyridols having 1 to 2 nuclear nitro substituents, one of which is in the 2-position in the pyridol nucleus, and 0 to 3 nuclear substituents selected from the group consisting of lower alkyl such as methyl, ethyl and propyl and halogen of atomic number 9 to 35, i.e., fluorine, chlorine and bromine. The cationic portion of these salts is an alkali metal, magnesium or ammonium ion. Preferred compounds are the alkali metal, magnesium and ammonium 2-nitro-3-pyridates.

The alkali metal pyridates of this invention include the sodium, potassium and lithium salts. Specific examples of this type of salt are sodium 2-nitro-3-pyridate, sodium 2,6-dinitro-3-pyridate, sodium 6-methyl-2-nitro-3-pyridate, potassium 4,5-dimethyl-2-nitro-3-pyridate, potassium 5-ethyl-2-nitro-3-pyridate, lithium 2-nitro-6-propyl-3-pyridate, lithium 4-chloro-2-nitro-3-pyridate, etc.

The magnesium salts are specifically illustrated by hydroxo magnesium 2-nitro-3-pyridate, magnesium di(4,5-diethyl-2-nitro-3-pyridate), magnesium di(6-chloro-2-nitro-3-pyridate), magnesium di(5-bromo-2-nitro-3-pyridate) and the like.

The ammonium salts of this invention are made with ammonium or amines. Spectroscopic evidence indicates a degree of complexing in these compounds. Thus, the term "salt" as applied to the ammonium compounds is intended to include such complexes. The ammonium groups may be nitrogen-substituted with from 0 to 3 organic groups having about 1 to 12 carbon atoms. The organic substituents of these ammonium groups may be aliphatic such as alkyl, hydroxyalkyl, haloalkyl, etc., alicyclic such as cyclohexyl, cyclobutyl and the like or aryl such as phenyl tolyl, xylyl, benzyl, etc.

Specific examples of ammonium salts are ammonium 2-nitro-3-pyridate, ammonium 2,5-dinitro-3-pyridate, ammonium 4-methyl-2-nitro-3-pyridate, ammonium 4,5-diethyl-2-nitro-3-pyridate, ammonium 4-fluoro-2-nitro-3-pyridate, methylammonium, 2,5-dinitro-3-pyridate, butylammonium 2-nitro-3-pyridate, cyclohexylammonium 2-nitro-3-pyridate, phenylammonium 2-nitro-3-pyridate, dimethylammonium 2-nitro-3-pyridate, dihexylammonium 2-nitro-3-pyridate, diphenylammonium 4-methyl-2,6-dinitro-3-pyridate and triethanolammonium 2-nitro-3-pyridate.

These unique water-soluble, herbicidally-active salts may be made by well known methods. A suitable nitro-substituted 3-ypridol, nitro-substituted alkyl 3-pyridol or nitro-substituted halo 3-pyridol is used as the starting material.

To prepare the metal salts, alkali metal or alkaline earth metal alkoxides are used. Preferably, the alkoxides in the presence of a compatible alcohol solvent will be used to prepare the metal salts. For best results the more simple alkoxides such as the methoxides and ethoxides and the corresponding alcohols, ethanol and methanol, will be used. This reaction may be conveniently done at temperatures ranging from 0 to 100° C. and at atmospheric or autogenous pressures.

To make the ammonium salts, the starting material is aminated with ammonia or amines by methods also well known in the art. If ammonia or a gaseous amine is the aminating agent, use of superatmospheric pressures may be desirable. Otherwise, it is convenient to merely boil the starting material in amine—the temperature of the reaction depending upon the particular amine reactant.

The nitro-substituted 3-pyridol precursors of the water-soluble salts of this invention are made by reacting 3-pyridol, alkyl 3-pyridol or halo 3-pyridol with a strong nitrating agent such as concentrated nitric acid, mixtures of nitric and sulfuric acid or a nitrate which is soluble in sulfuric acid. This reaction is carried out in the presence of an acidic anhydrous dehydrating medium such as concentrated sulfuric or phosphoric acid at temperatures between about —5 and 100° C., usually between 0 and 50° C. Atmospheric or autogenous pressure is used. The mol ratio of pyridol to nitrating agent is usually 0.5:1 to 1.5:1. For best results stoichiometric proportions are used.

Compounds of this invention and mehods for preparing them are specifically illustrated by the following examples. These examples are offered by way of illustration only and are not to be taken as limiting this invention.

EXAMPLE 1

Into a flask were changed a 7.00 g.-portion of 2-nitro-3-pyridol and 100 mls. absolute methanol. To this solution was added a solution of 2.70 g. sodium methoxide on 50 ml. methanol. The methanol was removed at subatmospheric pressure leaving 8.41 g. residue. The residue was dried at 60° C., 15 mm. Hg for 16 hours to give sodium 2-nitro-3-pyridate solid which melted at 300° C. with charring its nitrogen analysis (wt. percent) was: percent calc.—17.28; percent found—15.69.

EXAMPLE 2

A solution of 14.00 g. 2-nitro-3-pyridol in 200 ml. anhydrous methanol was put in a vessel. 1.22 g. of Mg. metal dissolved in 50 ml. anhydrous methanol was added to it. The methanol was stripped off under subatmospheric pressure at 50° C. leaving a crystalline residue. The residue was dried for 16 hours at 60° C. under vacuum to give 17.17 g. of the magnesium salt of 2-nitro-3-pyridol. Its melting point was 330° C. (charred). Nitrogen analysis (wt. percent) was: percent calc.—18.54; percent found—14.33.

EXAMPLE 3

7.00 g. of 2-nitro-3-pyridol in 150 ml. anhydrous benzene was put into a vessel. With stirring, anhydrous ammonia was bubbled into the solution until it was saturated. A precipitate formed as the ammonia was added. The mixture was then filtered and washed with benzene. The solids were dried at 40° C. under vacuum to give 8.00 gm. ammonium 2-nitro-3-pyridate. Its melting point was 145–155° C. After recrystallization from ethanol it melted at 142–145° C. Nitrogen analysis (wt. percent) was: percent calc.—26.8; percent found—25.8.

Using methods similar to those described in Examples 1 through 3 other 2-nitro-3-pyridates were prepared. For convenience these pyridates along with their physical characterizations are tabulated below.

TABLE I

| Compound | Weight Percent N | |
|---|---|---|
| | Calc. | Found |
| Triethanolammonium 2-nitro-3-pyridate | 14.55 | 14.19 |
| Ammonium 6-methyl-2-nitro-3-pyridate | 24.6 | 24.40 |
| Ammonium 5-methyl-2-nitro-3-pyridate | 24.6 | 24.71 |
| Methylammonium 2-nitro-3-pyridate | 24.6 | 24.5 |
| Dimethylammonium 2-nitro-3-pyridate | 22.7 | 21.11 |
| Ammonium 4-methyl-2-nitro-3-pyridate | 24.6 | 24.75 |
| Triethylammonium | 17.45 | 16.85 |

The pyridates of this invention are highly soluble in water. All are at least soluble to the extent of 100 g./l. Therefore, they may be easily and readily formulated into aqueous herbicidal concentrates suitable for further dilution with water prior to application to the soil media in herbicidally effective amounts. Alternatively, these water-soluble pyridates may be made up at concentrations suitable for direct application to plant environments. For best herbicidal control, these aqueous formulations will also contain a wetting or dispersing agent to enhance their effectiveness.

Nearly all the pyridates of this invention are crystalline solids. Therefore, most of them may also be formulated with solid carriers such as dust, powders, clays or granules.

In addition, these herbicidal formulations may contain compatible fungicides, nematocides, biocides, insecticides, and other herbicides and pesticides as well as adjuvants, conditioners, fillers, growth stimulators, plant hormones and the like.

The pyridates of this invention have a wide range of herbicidal activity against undesirable grasses, broad-leaved weeds and other noxious vegetation. They have been used to kill or control such undesirable vegetation as mustard, rye grass, pigweed, bermudagrass, crabgrass, watergrass and lambsquarter. At the same time, these water-soluble pyridates did not harm crop grasses, corn, sugar beets and alfalfa. Ammonium salts showed highly specific control of watergrass, bermudagrass and pigweed. Sodium and magnesium salts displayed complete, selective control of bermudagrass and watergrass growing contiguously with sugar beets.

Compounds of this invention have also shown other biocidal activity. For instance, they have shown good in vitro fungicidal activity.

As will be evident to those skilled in the art, various modifications on this invention can be made or followed, in the light of the foregoing disclosure and discussion, without departing from the spirit or scope of the disclosure or from the scope of the following claims.

What I claim is:

1. A water-soluble salt of a 3-pyridol having 1 to 2 nuclear nitro substituents, one of which is in the 2-position of the pyridol nucleus, and 0 to 2 nuclear substituents selected from the group consisting of lower alkyl and halogen of atomic number 9 to 35 wherein the cationic portion of said salt is an alkali metal, magnesium or ammonium ion.

2. A water-soluble salt of 2-nitro-3-pyridol wherein the cationic portion of said salt is an alkali metal, magnesium or ammonium ion.

3. The water-soluble salt of claim 2 wherein the cationic portion of said salt is a sodium ion.

4. The water-soluble salt of claim 2 wherein the cationic portion of said salt is an ammonium ion.

5. The water-soluble salt of claim 2 wherein the cationic portion of said salt is a triethylammonium ion.

6. The water-soluble salt of claim 2 wherein the cationic portion of said salt is a magnesium ion.

7. The water-soluble salt of claim 2 wherein the cationic portion of said salt is a triethanolammonium ion.

References Cited

UNITED STATES PATENTS

| 1,889,303 | 11/1932 | Wulff | 260—297 |
| 1,957,089 | 5/1934 | Wulff | 260—297 |
| 3,249,419 | 5/1966 | Martin | 260—297 XR |

HENRY R. JILES, *Primary Examiner.*

A. L. ROTMAN, *Assistant Examiner.*